Patented Jan. 11, 1944

2,338,863

UNITED STATES PATENT OFFICE 2,338,863

VULCANIZATION OF RUBBER

Roger A. Mathes, Akron, Ohio, assignor to The B. F. Goodrich Company, New York, N. Y., a corporation of New York No Drawing. Application December 24, 1940, Serial No. 371,579

10 Claims. (Cl. 260—787)

This invention relates to the vulcanization of rubber and pertains specifically to the acceleration of vulcanization by the reaction products of halogenated acyl derivatives of arylamines with metallic salts of the 2-mercaptothiazolines.

I have discovered that this class of compounds, hitherto unknown, provides excellent accelerators in spite of the fact the 2-mercaptothiazoline, from which the compounds are derived, has been reported in the literature to be a poor accelerator. The mercaptothiazolines which form the basis of my new accelerators may be substituted in a variety of ways, and include such compounds as 2-mercaptothiazoline, 2-mercapto 4-methyl thiazoline, 2-mercapto 4,5-dimethyl thiazoline, 2-mercapto 4-ethyl thiazoline, 2-mercapto 4,5-diethyl thiazoline, 2-mercapto 4-phenyl thiazoline, 2-mercapto 4-methoxy thiazoline, 2-mercapto 4,5 tetramethylene thiazoline, 2-mercapto 4-p-aminophenyl thiazoline, and the like. For the other component of my new class of accelerators, any halogenated acyl derivatives of any aryl amine may be used, such as alpha-chloroacetanilide, alpha-chloroacetoacetanilide, alpha-chloropropionanilide, alpha- chloro p-nitracetanilide, alpha-chloro o-bromacetanilide, alpha-dichloroacetanilide, alpha-dichloro propionanilide, alpha - chloracettoluidide, alpha - chloroacetoacettoluidide, alpha-dichloroacettoluidide, alpha-chloroacetxylidide, and the like.

Monocarboxylic acids, saturated or unsaturated, and their metallic salts, which serve as activators for 2-mercaptothiazoline, as disclosed in the copending application of Jones and Mathes, Serial No. 255,358, filed February 8, 1939, likewise activate my new accelerators. Acids which may be used comprise stearic, lauric, caprylic, linoleic, oleic, palmitic, benzoic, salicylic, and the like; the salts of these acids with sodium, potassium, magnesium, lead, zinc, tin, and any other alkali, alkaline earth, or heavy metals may also be used. An appreciable activating effect is obtainable with only a trace of these materials, but it is preferred to use from 1% to 5% or more.

My accelerators may be made by reacting equimolecular proportions of the thiazoline and the monochloro-acyl amine, or by reacting two moles of the thiazoline with the dichloroacyl amine. In the preferred form of my invention the reaction is carried out by boiling the thiazoline and the chloroacyl amine with an alcoholic alkali solution for a short time, then filtering off the sodium chloride produced and evaporating the solvent.

As a specific example of my invention I have prepared an accelerator by refluxing for about half an hour a mixture consisting of 6.8 g. of alpha-chloroacetoacetanilide, 3.8 g. of 2-mercaptothiazoline, and 1.4 g. of sodium hydroxide in 50 ml. of ethyl alcohol. At the end of this period the reaction mixture was cooled, filtered, and the solvent was removed by evaporation to leave an oily product.

This reaction is believed to proceed as follows:

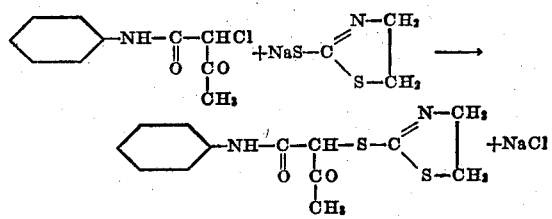

I have also prepared an accelerator by refluxing a mixture of 3.3 g. of 2-mercaptothiazoline, 5 g. of alpha-chloroacetanilide, and 1.2 g. of sodium hydroxide in 50 ml. of ethyl alcohol for about one-half hour, cooling, filtering, and evaporating the alcohol to leave an oily product.

The product of this reaction is believed to be formed as follows:

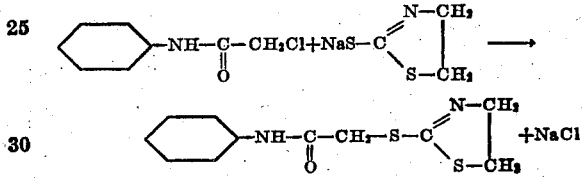

When compounded with rubber in the following recipes

| | A | B |
|---|---|---|
| Rubber | 100 | 100 |
| Sulfur | 3.5 | 3.5 |
| Zinc oxide | 5.0 | 5.0 |
| Lauric acid | 3.0 | 3.0 |
| Alpha-chloroacetoacetanilide reaction product | 1.0 | 0.0 |
| Alpha-chloroacetanilide reaction product | 0.0 | 1.0 | and cured in a mold at 287° F. my accelerators gave stocks with the following physical properties, where T is ultimate tensile strength in pounds per square inch, and E is elongation at break in per cent:

| Time of cure; minutes | A | | B | |
|---|---|---|---|---|
| | T | E | T | E |
| 15 | 2,630 | 895 | 2,490 | 885 |
| 30 | 3,085 | 800 | 3,070 | 825 |
| 60 | 3,420 | 780 | 3,270 | 800 |

These results clearly show that my new accelerators provide a vulcanized rubber composition having valuable properties.

Our new accelerators are effective not only with natural rubber or caoutchouc, but also with balata, gutta percha, latex, rubber isomers, or any synthetic rubber which can be vulcanized, that is, which loses its property of thermoplasticity and becomes elastic when heated in the presence of sulfur, and the term "a rubber" is used in the claims to designate all of the above-mentioned materials.

Pigments, fillers, reinforcing agents, antioxidants, softeners, other accelerators, etc., may also be present in the composition.

Compositions made with my accelerator may be put to a variety of uses, such as for pneumatic and solid tires, belting, hose, foot-wear, surgical goods, latex dipped goods, all manner of molded goods, and the like.

For the vulcanizing of compositions containing my accelerator any of the usual methods may be used, such as heating in a mold, in steam, hot air, hot water, etc.

Although specific embodiments of my invention have herein been disclosed, I do not intend to limit myself solely thereto, for many variations and modifications lie within the spirit and scope of my invention as defined in the appended claims.

I claim:

1. The process of vulcanizing a rubber in the presence of an N-acylated aryl amine of the structure

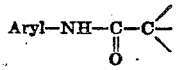

in which there is attached to the carbon atom adjacent to the carbonyl group at least one and not more than two groups of the structure

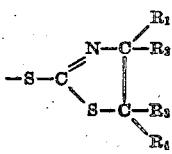

in which $R_1$, $R_2$, $R_3$ and $R_4$ are members of the class consisting of hydrogen, hydrocarbon, and alkyl ether groups, the remaining free valences of said carbon atom being satisfied by members of the class consisting of hydrogen, hydrocarbon, and acyl groups; and in the presence of a member of the class consisting of monocarboxylic acids and their metallic salts.

2. The process of vulcanizing a rubber in the presence of an N-acylated aryl amine of the structure

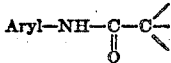

in which there is attached to the carbon atom adjacent to the carbonyl group one group of the structure

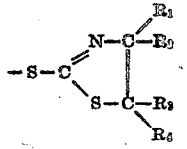

in which $R_1$, $R_2$, $R_3$, and $R_4$ are members of the class consisting of hydrogen, hydrocarbon, and alkyl ether groups, the remaining free valences of said carbon atom being satisfied by members of the class consisting of hydrogen, hydrocarbon, and acyl groups, and in the presence of a member of the class consisting of monocarboxylic acids and their metallic salts.

3. The process of vulcanizing a rubber in the presence of an N-acylated aryl amine of the structure

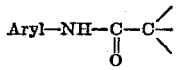

in which there are attached to the carbon atom adjacent to the carbonyl group two groups of the structure

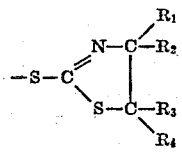

in which $R_1$, $R_2$, $R_3$, and $R_4$ are members of the class consisting of hydrogen, hydrocarbon, and alkyl ether groups, the remaining free valences of said carbon atom being satisfied by a member of the class consisting of hydrogen, hydrocarbon, and acyl groups; and in the presence of a member of the class consisting of monocarboxylic acids and their metallic salts.

4. The process of vulcanizing a rubber in the presence of a compound with the structure

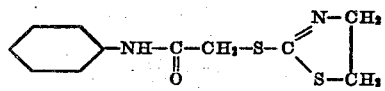

and of a member of the class consisting of monocarboxylic acids and their metallic salts.

5. The process of vulcanizing a rubber in the presence of a compound with the structure

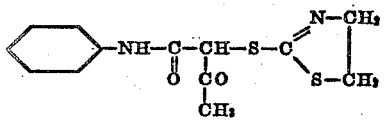

and of a member of the class consisting of monocarboxylic acids and their metallic salts.

6. A composition comprising a rubber vulcanized in the presence of an N-acylated aryl amine of the structure

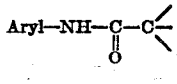

in which there is attached to the carbon atom adjacent to the carbonyl group at least one and not more than two groups of the structure

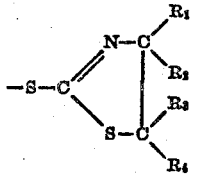

in which $R_1$, $R_2$, $R_3$, and $R_4$ are members of the class consisting of hydrogen, hydrocarbon, and alkyl ether groups, the remaining free valences of said carbon atom being satisfied by members of the class consisting of hydrogen, hydrocarbon, and acyl groups; and in the presence of a member of the class consisting of monocarboxylic acids and their metallic salts.

7. A composition comprising a rubber vulcanized in the presence of an N-acylated aryl amine of the structure

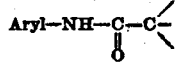

in which there is attached to the carbon atom adjacent to the carbonyl group one group of the structure

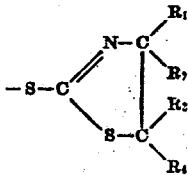

in which $R_1$, $R_2$, $R_3$, and $R_4$ are members of the class consisting of hydrogen, hydrocarbon, and alkyl ether groups, the remaining free valences of said carbon atom being satisfied by members of the class consisting of hydrogen, hydrocarbon, and acyl groups; and in the presence of a member of the class consisting of monocarboxylic acids and their metallic salts.

8. A composition comprising a rubber vulcanized in the presence of an N-acylated aryl amine of the structure

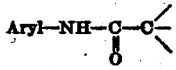

in which there are attached to the carbon atom adjacent to the carbonyl group two groups of the structure

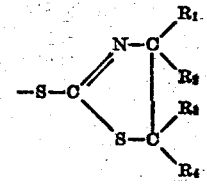

in which $R_1$, $R_2$, $R_3$, and $R_4$ are members of the class consisting of hydrogen, hydrocarbon, and alkyl ether groups, the remaining free valence of said carbon atom being satisfied by a member of the class consisting of hydrogen, hydrocarbon, and acyl groups; and in the presence of a member of the class consisting of monocarboxylic acids and their metallic salts.

9. A composition comprising a rubber vulcanized in the presence of a compound with the structure

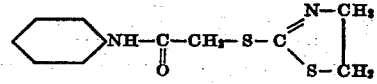

and a member of the class consisting of monocarboxylic acids and their metallic salts.

10. A composition comprising a rubber vulcanized in the presence of a compound with the structure

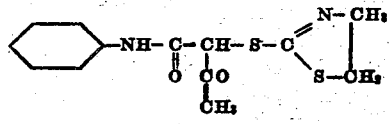

and a member of the class consisting of monocarboxylic acids and their metallic salts.

ROGER A. MATHES.